United States Patent [19]  
Collins

[11] 3,890,308  
[45] June 17, 1975

[54] PLASTIC INJECTION MOLDING MACHINE
[75] Inventor: Harvey H. Collins, Athol, Mass.
[73] Assignee: Package Machinery Company, East Longmeadow, Mass.
[22] Filed: Oct. 12, 1973
[21] Appl. No.: 405,815

[52] U.S. Cl................ 425/242 R; 74/520; 164/341; 249/162; 425/DIG. 220; 425/451.6
[51] Int. Cl............................. B29f 1/00; B29c 1/16
[58] Field of Search............ 425/450 R, 451, 242 R, 425/DIG. 222, DIG. 220, DIG. 223, 451.5, 451.6; 249/162; 164/339, 341; 100/286; 74/520

[56] References Cited
UNITED STATES PATENTS

| | | | |
|---|---|---|---|
| 3,492,700 | 2/1970 | Kornmayer | 425/242 X |
| 3,505,708 | 4/1970 | Moslo | 164/341 X |
| 3,611,497 | 10/1971 | Gidge et al. | 425/DIG. 222 |
| 3,736,092 | 5/1973 | Konig et al. | 425/450 |

*Primary Examiner*—Francis S. Husar
*Assistant Examiner*—Robert J. Charvat
*Attorney, Agent, or Firm*—McCormick, Paulding & Huber

[57] ABSTRACT

A plastic injection molding machine utilizing a gear driven toggle linkage for reciprocating a movable die plate relative to a fixed die plate to engage or close and to open the sections or halves of a mold. The linkage is characterized in that the toggle draws the movable plate toward the fixed plate and locks the mold halves in engaged position when the toggle is substantially "dead center" at its shortest length. The machine also features a reciprocating screw in its plasticizing and injecting unit, and a common drive is provided for the toggle linkage and the screw.

7 Claims, 4 Drawing Figures

FIG. I

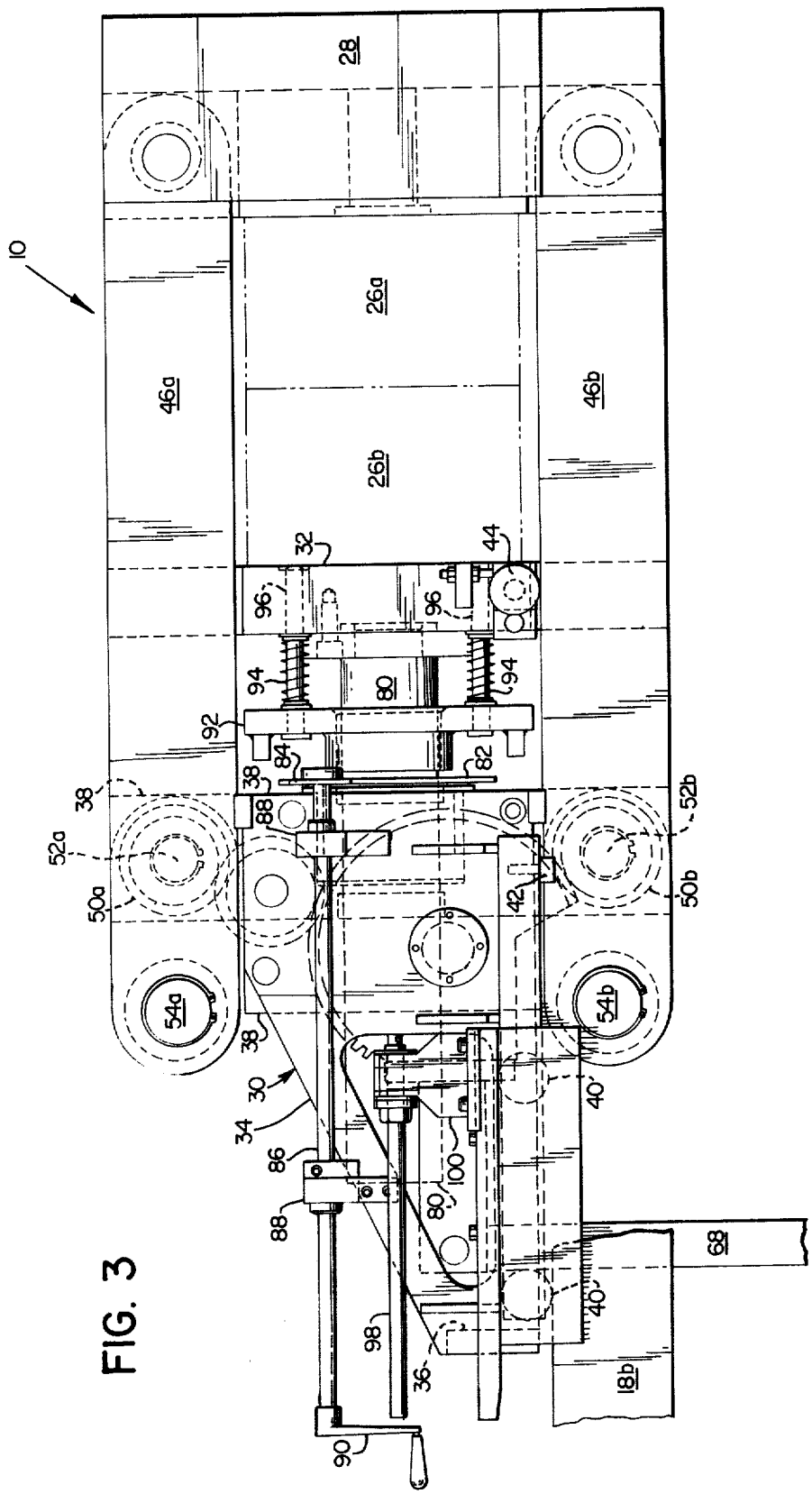

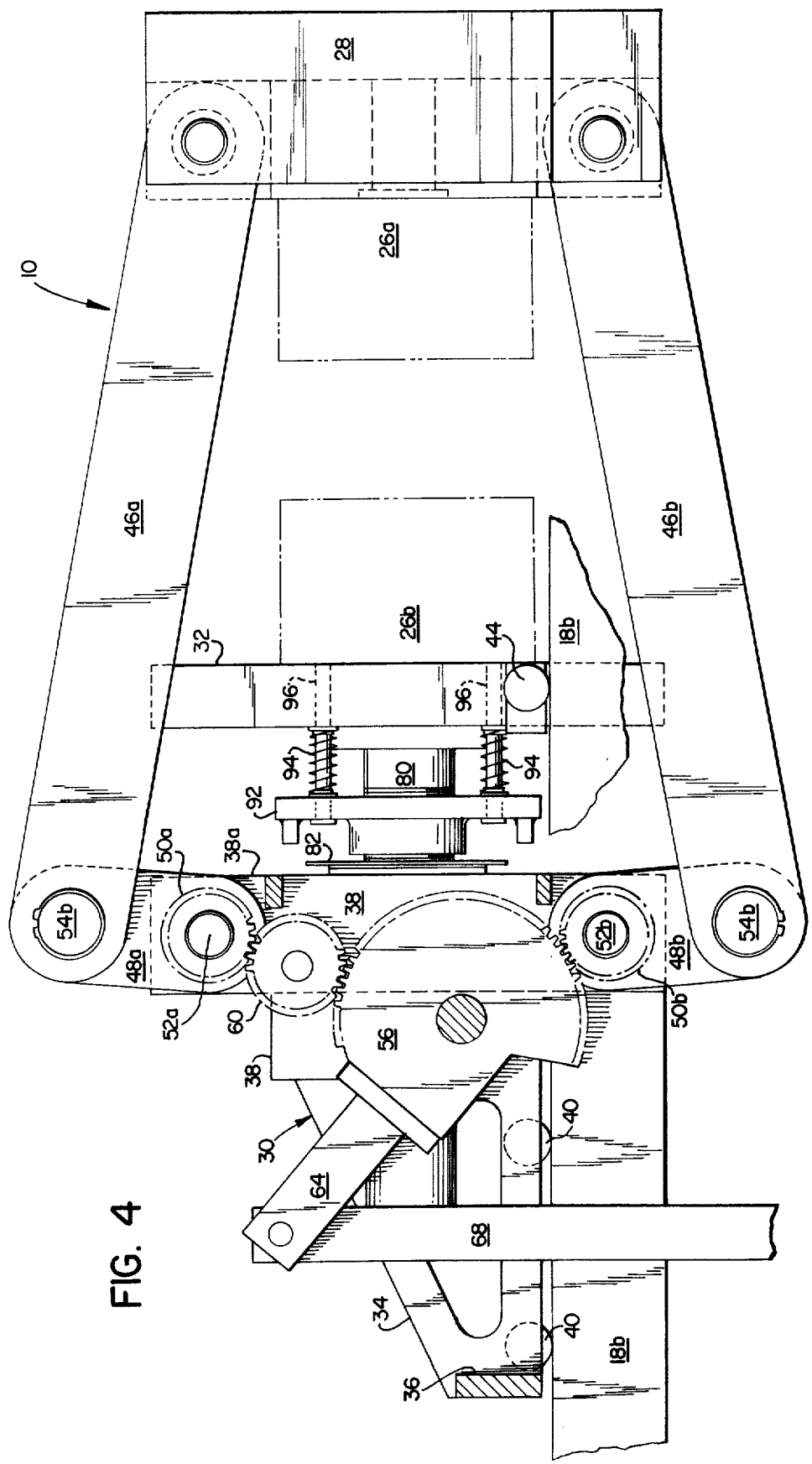

PLASTIC INJECTION MOLDING MACHINE

BACKGROUND OF THE INVENTION

Most plastic injection molding machines are hydraulically operated. That is, a transversely disposed fixed die plate is located on the machine bed at a substantial distance from another fixedly located plate or head and a movable die plate is hydraulically operated to be thrust from the second mentioned fixed plate toward the fixed die plate when the mold halves supported by the die plates are engaged or closed. Tie bars are employed to retain the lock-up force by compression.

Such machines are costly to build and are of necessity very large and space consuming, particularly if they are adapted to mold rather large articles.

SUMMARY OF THE INVENTION

In keeping with the present invention, a plastic injection molding machine is provided with a longitudinal base, and a fixed die plate mounted transversely on the base to support a mold half. A carriage is movable longitudinally on the base and it supports a second die plate and complementary mold half. This carriage is reciprocated to engage and disengage the mold halves, the mechanism being used to reciprocate the carriage comprising at least two toggles. Each such toggle includes a gear driven crank arm and a connecting arm, the crank arm being pivotally connected to the carriage and the connecting arm being pivotally connected to the fixed die plate. A common drive is provided for simultaneously pivoting the crank arms of the respective toggles between positions wherein the mold halves are engaged and most widely separated, the first position being when each toggle is substantially dead center and of shortest length and the second such position being when each toggle is substantially dead center and of greatest length.

The invention also provides for a reciprocating screw type plasticizing and injecting unit, and a common drive is used for the toggle and the screw. That is, a single electric motor has one output shaft which is selectively engaged to operate the crank arms of the toggles through gearing and it has another output shaft which is selectively engaged to rotate the plasticizing screw. The electric motor is further utilized to operate a pump providing hydraulic fluid under pressure to a pair of hydraulic motors which thrust the screw forwardly in the injecting stroke.

It is the general object of the invention to provide a plastic injection molding machine of economical construction and which is not as space consuming as conventional machines of the same general type.

BRIEF DESCRIPTION OF THE DRAWINGS

FIG. 3 is a front elevational view of the mechanism for opening and closing the mold, showing the mold in closed condition.

FIG. 4 is a view similar to FIG. 3 but shows the mold open.

DESCRIPTION OF THE PREFERRED EMBODIMENT

Figure 1:
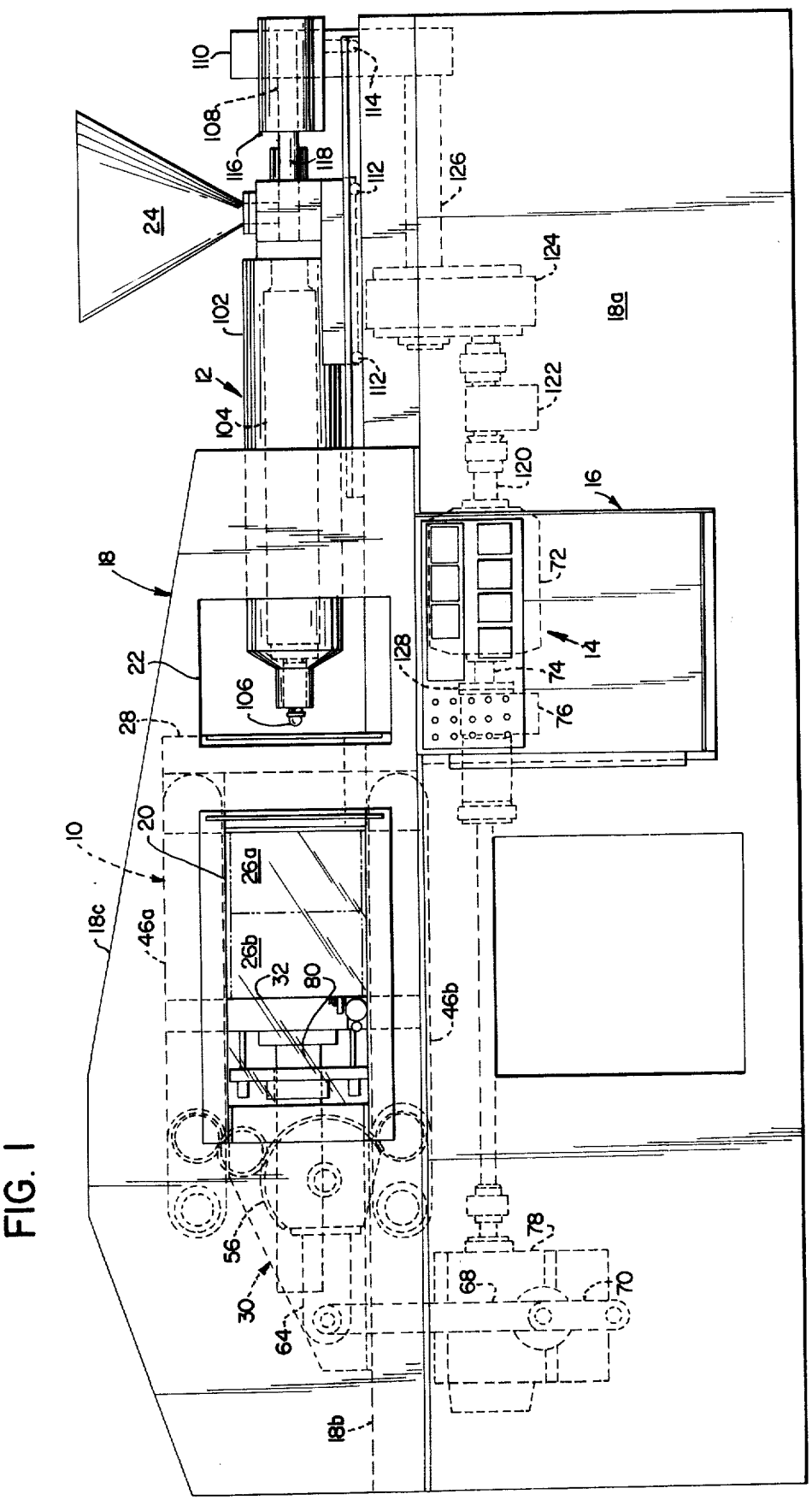
FIG. 1 is a front elevational view of a plastic injection molding machine incorporating the present invention.

As seen in FIG. 1, the machine provided according to the present invention includes a die or mold section 10, a plasticizing and injecting unit 12, a common drive 14 for the die section and for the plasticizing unit, and an operator control panel 16 mounted on the machine frame which is indicated generally by the reference number 18. The said frame comprises front and rear panels 18a, 18a and front and rear longitudinally extending rails 18b, 18b which cooperate with the said panels to define a machine base. There are also upper frame panels 18c at the front and rear of the machine in the area of the die section 10 and the longitudinally disposed plasticizing and injection unit 12. An access opening 20 is provided in the front upper panel 18c in the die area, and another opening 22 is provided near the front or nozzle end of the plasticizing and injection unit 12. Both of these openings are closed by safety gates or doors while the machine is in operation.

The machine is of the reciprocating screw type. That is, the plasticizing unit 12 includes a reciprocating feed and injection screw which is rotated by the drive 14 to plasticize particulate plastic material introduced to the plasticizing unit in a hopper 24. The heated plasticized melt is moved forwardly in the plasticizing unit toward its nozzle, and the pressure of the melt at the forward end of the screw forces the screw rearwardly until a predetermined charge or "shot" is in front of the screw. Then, screw rotation ceases and the screw is thrust forwardly in the injection stroke to force the plasticized material into the cavity defined between a pair of mold sections or halves 26a and 26b in the die or mold unit 10. The plasticizing unit and the drive for it will be described in greater detail hereinafter, attention now being direction to the die section 10.

The die structure includes a first die plate 28 which is fixedly supported in a transverse position on the machine base. This die plate supports the mold half 26a on one of its sides and it is adapted to receive the nozzle of the plasticizing and injection unit 12 on its other side. A carriage which is indicated generally by the reference number 30 supports a second die plate 32 transversely of the machine bed for reciprocating longitudinal movement toward and away from the fixed die plate 28. The die plate 32 supports the other mold half 26b so that in reciprocation of the carriage 30 the mold halves 26a and 26b can be engaged or closed as shown in FIGS. 1 and 3 or they can be disengaged and opened as shown in FIG. 4.

The carriage 30 includes front and rear plates 34, 34 which are connected by a crossbar or plate 36 and a central section or block 38. The carriage is moved longitudinally of the machine base on rollers 40, 40 which ride on top of the machine base rails 18b, 18b, the said rollers being supported by and extending outwardly from the front and rear carriage plates 34, 34. An upper longitudinal bar 18d is provided on the frame at the front and at the rear thereof over the rails 18b, 18b to hold the carriage rollers 40, 40 down, and the frame also includes front and rear skirts 18e, 18e outside the rollers 40, 40. Any tendency toward transverse movement of the carriage 30 is overcome by front and rear side rollers 42, 42 which engage the inner surfaces of the frame base rails 18b, 18b, the said rollers 42, 42 being rotatable on vertical axes. The die plate 32 supported by the carriage 30 also has a front and rear roller 44 which ride upon the longitudinally extending guide rails or base rails 18b, 18b.

The carriage 30 and the die plate 32 which it supports are caused to move longitudinally of the machine base by at least two toggles, one above and one below a central longitudinal horizontal plane through the carriage and the fixed die plate 28. In the preferred form shown there are four such toggles these being upper and lower front toggles and upper and lower rear toggles. Each such toggle includes a connecting arm pivotally connected to the fixed die plate 28 and a shorter crank arm pivotally connected to the carriage 30 and with the said connecting and crank arms pivotally connected together. More specifically, the upper front toggle comprises a connecting arm 46a and a crank arm 48a, the lower front toggle comprises connecting arm 46b and crank arm 48b, the upper rear toggle comprises connecting arm 46c and crank arm 48c and the lower rear toggle comprises connecting arm 46d and crank arm 48d.

Each toggle is operated by driving a pinion keyed to the shaft to which the toggle crank arm is also keyed and which is rotatably supported by the carriage body 38. That is, the toggle comprising the connecting arm 46a and crank arm 48a is operated by rotation or oscillation of a pinion 50a keyed to the shaft 52a to which the crank arm 48a is also keyed and which is rotatably mounted in a portion 38a of the carriage body 38. Thus, if the pinion 50a is oscillated through 180°, it will pivot the crank arm 48a through 180 degrees and the crank arm 48a being pivotally connected to the connecting rod 46a by a rotatable shaft 54a, the toggle comprising the arms or links 46a and 48a can be moved from the dead center position shown in FIG. 3 of shortest effective length to a dead center position of greatest effective length. Similarly, a pinion 50b pinned to crank arm shaft 52b will pivot the crank arm 48b connected to connecting arm 46b by shaft 54b, the shaft 52b being rotatably supported or journalled in the carriage body portion 38b. Pinion 50c operates in the same manner for the toggle made up of the arms 46c and 48c and the pinion 50d operates in that manner for the toggle comprising the arms 46d and 48d. The pinion 50c is associated with a carriage body portion 38c and the pinion 50d is associated with a carriage portion 38d and rotatable shafts 54c and 54d are associated with toggle arms 46c and 48c and with arms 46d and 48d, respectively.

In accordance with the present invention, the pinions 50a, 50b, 50c and 50d are located and pinned to their respective shafts 52a–52d in such position that all of the toggles will be operated simultaneously and at any point in time assume the same relative position. As mentioned above, the toggles are to be operated from one dead center position wherein each toggle is of its shortest effective length to a second dead center position wherein each toggle is of its greatest effective length. It may not be necessary in all cases to have the toggle assume the dead center position of greatest effective length. That is, when the toggles are of shortest effective length and in dead center as shown in FIG. 3, the mold halves 26a and 26b are engaged or closed and when the toggles are pivoted from such position the mold halves are separated or opened, but it may not be necessary to move the toggles to a complete dead center position of greatest effective length in order to have sufficient separation between the mold halves for the removal of completed molded workpieces. Preferably, the toggles are so located and arranged as shown so that when they assume dead center conditions the connecting arm and crank arm of each toggle will lie in a horizontal plane. Thus, in the dead center shortest effective length condition with the mold halves closed, the connecting arms and crank arms of the respective toggles act like tie bars in conventional plastic injection molding machines, but the connecting arms 46a, 46b, 46c and 46d are under tension rather than compression.

In further keeping with the present invention, a common drive is utilized for all of the toggle pinions 50a–50d. This drive includes a front gear sector 56 and a matching rear gear sector 58 which are rotatably mounted on the inside of the carriage front and rear plates 34, 34. The front gear sector 56 is directly engaged with the lower toggle pinion 50b and indirectly engaged with the upper toggle pinion 50a through an idler pinion 60. The rear gear sector 58 is directly engaged with the lower rear toggle pinion 50d and indirectly engaged with the upper toggle pinion 50c through an idler pinion 62. The idler pinions 60 and 62 are rotatably supported on the carriage body 38.

Figure 2:
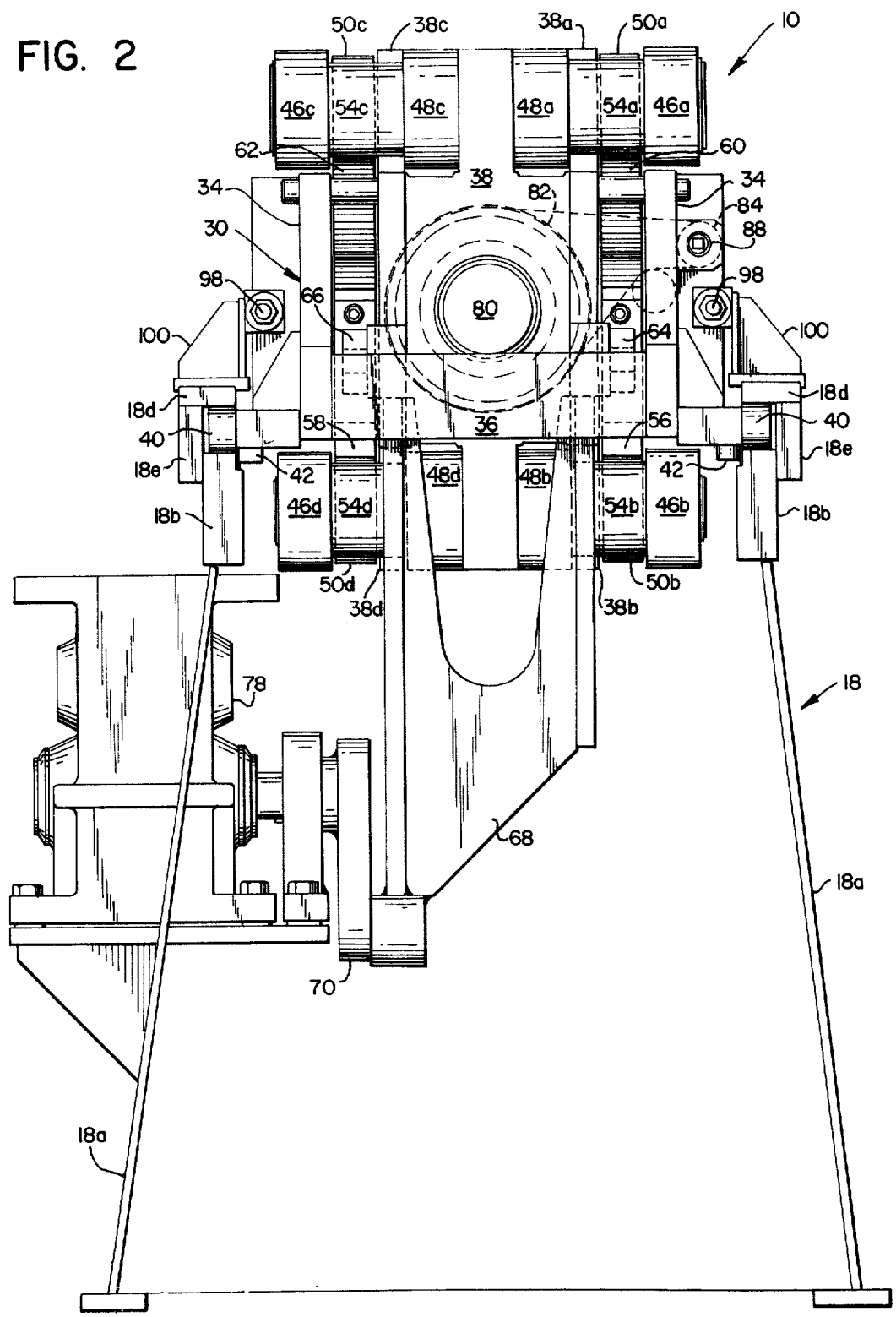
FIG. 2 is a left-hand end view of the machine but on a larger scale than FIG. 1.

The front gear sector 56 has an arm 64 and the rear gear sector 58 has an arm 66 which are pivotally connected to the legs of a bifurcated lever 68 (FIG. 2). The legs of lever 68 extend upwardly and its lower end is pivotally connected to the end of a driven crank 70 (FIGS. 1 and 2). The crank 70 is rotated through 360° in selected periods of operation by the drive 14.

The said drive 14 includes an electric motor 72 having one output shaft 74 extending toward the crank 70 and which includes an electric clutch-brake unit 76 of conventional design so that the motor output can selectively be transmitted to a speed control unit designated generally by the reference number 78. This speed control unit has its output directly connected to the crank 70 so that the rate of rotation of the said crank can be selected and controlled at the selected level. As the crank 70 is rotated, the lever 68 is reciprocated upwardly and downwardly and this lever by means of its connection with the sector arms 64 and 66 oscillates the front and rear gear sectors 56 and 58 and thereby operates the toggle pinions through a maximum of 180° of oscillation selectively to open and to close or to engage and disengage the mold halves 26a and 26b.

When the toggles are in dead center position of shortest effective length for engagement of the mold halves 26a and 26b, the said mold halves should be engaged and held closed with a very substantial force (on the order of thousands of pounds) to assure no leakage of the plastic material being injected into the mold cavity. In order to have the mold halves engage and close or lock-up with such force, the die plate 32 is made adjustable relative to the carriage 30. That is, the die plate 32 is adjustably supported on the carriage 30 so that mold halves of any given size may be engaged and held engaged with a selected force and the die plate is adjustable relative to the carriage so that the same force may be used with mold halves of different size and configuration.

More specifically, the die plate 32 is supported at the end of a shaft 80 having a portion which is threaded into the body 38 of the carriage 30. The plate 32 is mounted on the shaft 80 so that it will not rotate with the shaft, but as the shaft 80 is rotated it is moved relative to the carriage 30 thus to move the movable die plate 32 toward or away from the fixed die plate 28 as desired. The means for rotating the shaft 80 and thus to adjust the position of the die plate 32 includes a large sprocket 82 having a splined connection to the shaft 80 and which can be manually rotated by means of a smaller drive sprocket 84 (FIGS. 2 and 3). The drive sprocket 84 is secured to the end of a shaft 86 mounted on the carriage 30 by suitable brackets 88, 88, and the opposite end of the shaft 86 has a handle 90 accessible to an operator. Thus, by rotating the said handle, the operator can move the die plate 32 toward or away from the die plate 28 and relative to the carriage 30.

The carriage shaft 80 also supports an ejector plate 92 (FIGS. 3 and 4). The plate 92 is axially slidably supported on the shaft 80 and it is normally disposed at a selected spaced position behind the die plate 32 opposite the mold half 26b by springs 94, 94 mounted on ejector pins 96, 96 which are slidable in the die plate 32. When the carriage is retracted, that is, when the die halves 26 and 26b are disengaged, the ejector plate 92 will strike a pair of stop rods 98, 98 supported on a pair of brackets 100, 100 at the front and rear of the machine base to prevent further retraction of the ejector plate and thus to thrust the ejector pins 96, 96 into the cavity portion in the mold half 26b to eject or dislodge the finished plastic article. The rods 98, 98 are adjustably supported in the brackets 100, 100 to accommodate mold halves of different size.

An advantage of the toggle construction for reciprocating the carriage 30 resides in the rate at which the carriage will be moved as the toggles are operated to move from substantially one dead center position toward substantially the other dead center position. That is, as the toggles are operated to move toward dead center position of shortest effective length to close the mold halves, the mold halves will be moved quite rapidly toward engagement but will be slowed down as the mold half 26b closely approaches engagement with the mold half 26a and as the lock-up force is applied to retain the mold halves engaged or closed. This avoids slamming the mold halves together and the unnecessary wear that it could cause. Then, as the toggles approach dead center position of greatest effective length wherein the mold halves are most widely separated, the movement of the carriage and mold half 26b is slowed down. This avoids a heavy rapid thrust or slamming of the ejector pins 96, 96 into the mold cavity and avoids damage by the ejector pins on the finished article retained by the mold half 26 b.

Attention is now drawn more specifically to the plasticizing and injecting unit 12 which is shown in FIG. 1. The said unit is primarily of conventional construction in that it includes a heated barrel 102 having a central longitudinal bore 104 extending forwardly to a nozzle 106. A screw is reciprocable within the bore 104 to receive the particulate plastic material from the hopper 24 and to plasticize it within the bore of the heated barrel 102 and to move it as a plastic melt toward the front of the bore in the area immediately behind the nozzle 106. The plastic melt gathers behind the nozzle under high pressure and this causes the driven rotating screw to move rearwardly in the bore 104 as it continues to rotate and to move more plasticized material toward the nozzle in accumulating the charge which is to be injected. The screw has a rearwardly projecting shaft extension 108 which is connected to a gear in a gear box 110.

The plasticizing and injection unit 12 is normally positioned with the nozzle 106 thrust into the fixed die plate 28 and located in a suitable sprue communicating with the mold cavity in the mold half 26a. However, and as shown, the unit 12 can be moved longitudinally rearwardly on rollers 112, 112 engaging the base rails 18b, 18b and which support the barrel and hopper portion of the unit and on rollers such as the roller 114 which support the gear box 110. The unit 12 is moved rearwardly from its normal position to that position shown to provide access to the nozzle 106.

The plasticizing and injection unit also includes a pair of hydraulic cylinders, such as the hydraulic cylinder or fluid motor 116, on each side of the gear box 110. The said hydraulic cylinders or fluid motors are mounted on the rear end of the barrel and housing 102 as by support members such as the member 118, and the arrangement of the fluid motors is such that when the screw has been moved rearwardly to the position wherein the full charge is collected in front of the screw and near the nozzle, the cylinders operate to thrust the gear box 110 forwardly on its rollers 114, 114 and thus to thrust or ram the screw shaft 108 and screw forwardly in the injection stroke. The movement of the gear box and screw is relative to and independent of the barrel 102 which remains in the normal position with the nozzle 106 in the sprue.

As previously mentioned, the drive unit 14 serves to rotate or drive the screw in the plasticizing unit 12. That is, the electric motor 72 has an output shaft 120 extending to a clutch and brake unit 122 for selective operation of the output which extends further to a speed reducer 124. The output of the speed reducer 124 is connected by a splined shaft 126 with the gear box 110. Thus, when the clutch 122 is energized the input to the gear box 110 is driven to in turn drive the feed and plasticizing screw shaft 108. As the said screw moves rearwardly, the splined shaft 126 moves rearwardly in the speed reducer 124 with the rearward movement of the gear box.

Further, the drive unit 14 operates to provide hydraulic pressure for the fluid motor or motors 116. More specifically, a drive takeoff such as a belt 128 on the output shaft 74 of the electric motor 72 is used to operate an hydraulic pump (not shown). The pump is connected to the fluid motors 116 through suitable valve structure to thrust the screw and gear box 110 forwardly at the proper time. Rotation of the drive screw is generally stopped before the injection stroke, this being accomplished by means of the clutch-brake unit 122.

We claim:

1. In a plastic injection molding machine having a longitudinally extending base, a plasticizing and injecting unit, and a fixed die plate mounted transversely on the base and supporting a mold half, a carriage movable longitudinally on the base and supporting a second die plate and complementary mold half, a mechanism for reciprocating the carriage and thereby to engage and disengage the mold halves, said mechanism comprising at least two toggles respectively disposed on opposite sides of a longitudinal plane through the mold halves, each such toggle including a crank arm and connecting arm which are respectively pivotally connected to the carriage and to the fixed die plate and also to each other, and a common drive for simultaneously pivoting the crank arms between positions wherein the mold halves are engaged and most widely separated, the first such position being when each toggle is substantially dead center and of shortest length and the second such position being when each toggle is substantially dead center and of greatest length.

2. The mechanism defined in claim 1 wherein the said longitudinal plane is horizontal and each such toggle is so arranged that its crank and connecting arms are horizontally disposed when in dead center positions.

3. The mechanism of claim 2 wherein there are two toggles above the longitudinal plane and two toggles below the longitudinal plane.

4. The mechanism of claim 1 wherein the common drive for the toggles comprises a driven gear sector mounted on the carriage for oscillation, and a drive pinion associated with each crank arm, one of which crank arm pinions is directly engaged with the sector and the other of which is indirectly engaged with the sector through an idler pinion.

5. The mechanism as set forth in claim 3 wherein the common drive for the toggles comprises a driven rotatable crank, a lever pivotally connected to said last mentioned crank, a pair of gear sectors mounted on said carriage and connected to said lever for oscillation thereby, there being one such sector associated with each pair of toggles wherein a pair comprises a toggle above and a toggle below the longitudinal plane, a drive pinion associated with each crank arm in a toggle pair, one of which crank arm pinions is directly engaged with the associated sector and the other of which is indirectly engaged with the associated sector through an idler pinion.

6. The injection molding machine of claim 1 wherein the said second die plate is supported on said carriage for adjustment toward and away from said first die plate to assure engagement of the mold halves with preselected force when the toggles are substantially dead center and of shortest length.

7. The machine as defined in claim 6 wherein a shaft is threaded into said carriage and rotatably received in and supports said second die plate for longitudinal movement relative to said carriage responsive to rotation of said shaft, and means is provided for rotation of said shaft.

* * * * *